(12) United States Patent
Li

(10) Patent No.: US 12,705,318 B2
(45) Date of Patent: Aug. 11, 2026

(54) DATA CONTROL FOR ZERO-TRUST SECURITY CONTAINER

(71) Applicant: Alipay (Hangzhou) Information Technology Co., Ltd., Hangzhou (CN)

(72) Inventor: Wenjie Li, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 164 days.

(21) Appl. No.: 18/543,709

(22) Filed: Dec. 18, 2023

(65) Prior Publication Data

US 2024/0119127 A1 Apr. 11, 2024

Related U.S. Application Data

(63) Continuation of application No. PCT/CN2022/125182, filed on Oct. 13, 2022.

(30) Foreign Application Priority Data

Oct. 29, 2021 (CN) ......................... 202111269968.0

(51) Int. Cl.
*G06F 21/12* (2013.01)
*G06F 21/53* (2013.01)

(52) U.S. Cl.
CPC ............ *G06F 21/128* (2013.01); *G06F 21/53* (2013.01); *G06F 2221/034* (2013.01)

(58) Field of Classification Search
CPC .. G06F 21/128; G06F 21/53; G06F 2221/034; G06F 21/12
See application file for complete search history.

(56) References Cited

U.S. PATENT DOCUMENTS 7,805,415 B1 * 9/2010 Flesher ................... H04L 63/12 707/738
2010/0132012 A1 5/2010 Van Riel et al.
2017/0109204 A1 * 4/2017 Feng ..................... G06F 9/5083
2017/0163652 A1 6/2017 Peppe et al.
(Continued)

FOREIGN PATENT DOCUMENTS

CN 111131160 5/2020
CN 111709023 A 9/2020
(Continued)

OTHER PUBLICATIONS

Extended European Search Report in European Appln. No. 22885698.5, mailed on May 10, 2024, 9 pages.
(Continued)

*Primary Examiner* — Robert B Leung
*Assistant Examiner* — Howard H. Louie
(74) *Attorney, Agent, or Firm* — Fish & Richardson P.C.

(57) ABSTRACT

This specification describes a zero-trust security container data control. A computer-implemented method includes generating a zero-trust security policy based on a scenario. A data pool for a zero-trust security container is built. The zero-trust security policy is adopted for data to be in or out of the data pool, where admission or egress is allowed for the data to be in or out of the data pool only after the data is verified based on the zero-trust security policy. Data in the data pool is hierarchically isolated based on the zero-trust security policy, so that the data in the data pool can be read directionally.

20 Claims, 5 Drawing Sheets

(56) References Cited

U.S. PATENT DOCUMENTS

| | | | | |
|---|---|---|---|---|
| 2018/0121659 | A1* | 5/2018 | Sawhney | G06F 21/566 |
| 2018/0165470 | A1* | 6/2018 | Nachenberg | H04L 9/0897 |
| 2019/0213346 | A1 | 7/2019 | Friedman | |
| 2021/0089220 | A1* | 3/2021 | Gkoulalas-Divanis | G06F 21/6245 |

FOREIGN PATENT DOCUMENTS

| | | | |
|---|---|---|---|
| CN | 112100675 | | 12/2020 |
| CN | 112118102 | A | 12/2020 |
| CN | 112149105 | | 12/2020 |
| CN | 112671861 | A | 4/2021 |
| CN | 112765639 | A | 5/2021 |
| CN | 113507462 | | 10/2021 |
| CN | 114003865 | | 2/2022 |
| WO | WO 2023/071819 | | 5/2023 |

OTHER PUBLICATIONS

International Preliminary Report on Patentability in International Appln. No. PCT/CN2022/125182, mailed on May 10, 2024, 12 pages (with English translation).

International Search Report and Written Opinion in International Appln. No. PCT/CN2022/125182, mailed on Jan. 9, 2023, 14 pages (with English translation).

* cited by examiner

Figure 1:
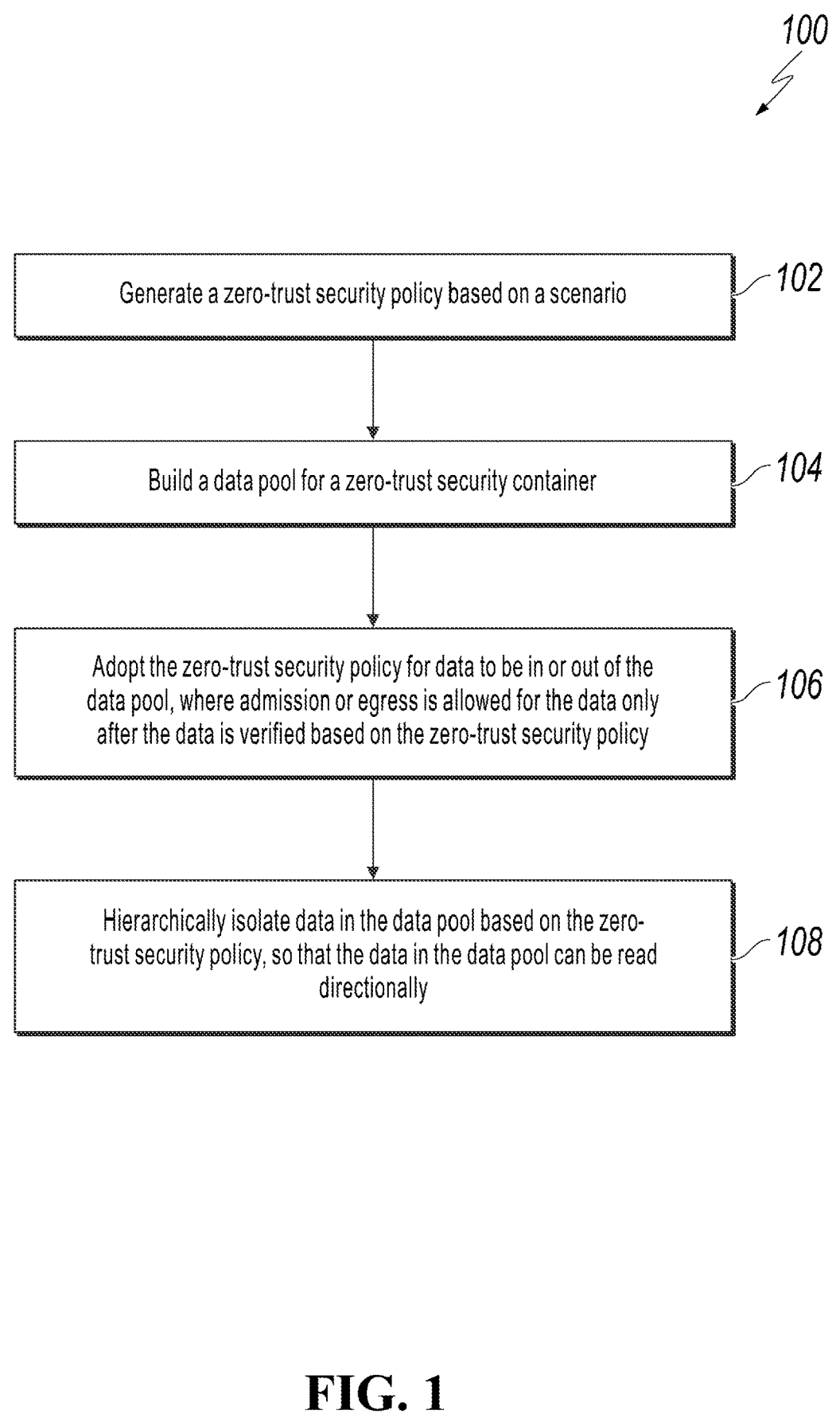

100

Generate a zero-trust security policy based on a scenario

102

Build a data pool for a zero-trust security container

104

Adopt the zero-trust security policy for data to be in or out of the data pool, where admission or egress is allowed for the data only after the data is verified based on the zero-trust security policy

106

Hierarchically isolate data in the data pool based on the zero-trust security policy, so that the data in the data pool can be read directionally

DATA CONTROL FOR ZERO-TRUST SECURITY CONTAINER

CROSS-REFERENCE TO RELATED APPLICATIONS

This application is a continuation of PCT Application No. PCT/CN2022/125182, filed on Oct. 13, 2022, which claims priority to Chinese Patent Application No. 202111269968.0, filed on Oct. 29, 2021, and each application is hereby incorporated by reference in its entirety.

TECHNICAL FIELD

This specification mainly relates to applet security, and in particular, to applet container security.

BACKGROUND

Currently, network users use an extensive quantity of applets. However, as the quantity of applets increases explosively, security risks of the applets gradually emerge. Data leakage may be caused by improper use of applet APIs, vulnerabilities in service logic interaction with third-party servers, and less rigorous server data verification.

Security has become the biggest challenge for users to use container technologies and cloud services. Data security is the most prominent problem. In recent years, the quantity of data leaks and the amount of leaked data have increased rapidly.

Therefore, solutions for strictly and efficiently controlling data of applet containers are needed in the industry.

SUMMARY

To resolve the above-mentioned technical problems, this specification provides data control solutions for a zero-trust security container. In the solutions, a data pool for a zero-trust security container can be built. Not only data to be in or out of the data pool can be verified based on a zero-trust security policy, but also data in the data pool can be isolated based on the zero-trust security policy, thereby implementing strict control on data of applet containers.

According to some embodiments of this specification, a data control method for a zero-trust security container is provided, including: a zero-trust security policy is generated based on a scenario; a data pool for a zero-trust security container is built; the zero-trust security policy is adopted for data to be in or out of the data pool, where admission or egress is allowed for the data to be in or out of the data pool only after the data is verified based on the zero-trust security policy; and data in the data pool is hierarchically isolated based on the zero-trust security policy, so that the data in the data pool can be read directionally.

In some other embodiments of this specification, the zero-trust security policy includes trusting none of data reading/writing parties.

In some other embodiments of this specification, the zero-trust security policy includes the following: a source is verified for data to be written to the data pool; and data whose source is verified is admitted, where the admitted data is labeled with a source label.

In still some other embodiments of this specification, the zero-trust security policy includes the following: a source and a role of a data writing party are verified for data to be written to the data pool; and data whose source and role of a data writing party are verified is admitted, where the admitted data is labeled with a source label and a role label of the data writing party.

In some other embodiments of this specification, the zero-trust security policy includes the following: a source, a role of a data writing party, and a role of a data reading party that are provided by the data reading party are verified for data to be read from the data pool; and data whose source, role of a data writing party, and role of a data reading party are verified is egressed.

In still some other embodiments of this specification, that data in the data pool is hierarchically isolated based on the zero-trust security policy includes the following: the data pool is isolated into multiple data domains.

In some other embodiments of this specification, that the data pool is isolated into multiple data domains includes the following: the data is isolated into the multiple data domains by sensitive data and runtime data.

In some other embodiments of this specification, that the data pool is isolated into multiple data domains includes the following: the data is isolated into the multiple data domains by source and/or role.

In still some other embodiments of this specification, corresponding protection levels are set for the multiple data domains.

According to some embodiments of this specification, a data control system for a zero-trust security container is provided, including: a zero-trust policy module, configured to generate a zero-trust security policy based on a scenario; a data pool building module, configured to build a data pool for a zero-trust security container; a zero-trust verification module, configured to adopt the zero-trust security policy for data to be in or out of the data pool, where admission or egress is allowed for the data to be in or out of the data pool only after the data is verified based on the zero-trust security policy; and a data isolation module, configured to hierarchically isolate data in the data pool based on the zero-trust security policy, so that the data in the data pool can be read directionally.

In some other embodiments of this specification, the zero-trust security policy includes trusting none of data reading/writing parties.

In some other embodiments of this specification, the zero-trust security policy includes the following: a source is verified for data to be written to the data pool; and data whose source is verified is admitted, where the admitted data is labeled with a source label.

In still some other embodiments of this specification, the zero-trust security policy includes the following: a source and a role of a data writing party are verified for data to be written to the data pool; and data whose source and role of a data writing party are verified is admitted, where the admitted data is labeled with a source label and a role label of the data writing party.

In some other embodiments of this specification, the zero-trust security policy includes the following: a source, a role of a data writing party, and a role of a data reading party that are provided by the data reading party are verified for data to be read from the data pool; and data whose source, role of a data writing party, and role of a data reading party are verified is egressed.

In still some other embodiments of this specification, that the data isolation module hierarchically isolates data in the data pool based on the zero-trust security policy includes the following: the data isolation module isolates the data pool into multiple data domains.

In some other embodiments of this specification, that the data isolation module isolates the data pool into multiple data domains includes the following: the data isolation module isolates the data into the multiple data domains by sensitive data and runtime data.

In some other embodiments of this specification, that the data isolation module isolates the data pool into multiple data domains includes the following: the data isolation module isolates the data into the multiple data domains by source and/or role.

In still some other embodiments of this specification, corresponding protection levels are set for the multiple data domains.

According to some embodiments of this specification, a computer-readable storage medium that stores an instruction is provided, where when the instruction is executed, a machine is enabled to perform the above-mentioned methods.

The summary is provided to describe some concepts in a simplified form. These concepts are further described in detail below. The summary is neither intended to identify key features or essential features of the claimed subject matter nor is intended to limit the scope of the claimed subject matter.

DESCRIPTION OF THE DRAWINGS

The above-mentioned summary of this specification and the following specific implementations are better understood when read with reference to the accompanying drawings. It should be noted that the accompanying drawings are merely examples of the claimed invention. The same reference numerals in accompanying drawings can represent same or similar elements.

FIG. 1 is a flowchart illustrating a data control method for a zero-trust security container, according to some embodiments of this specification;

DESCRIPTION OF EMBODIMENTS

Figure 2:
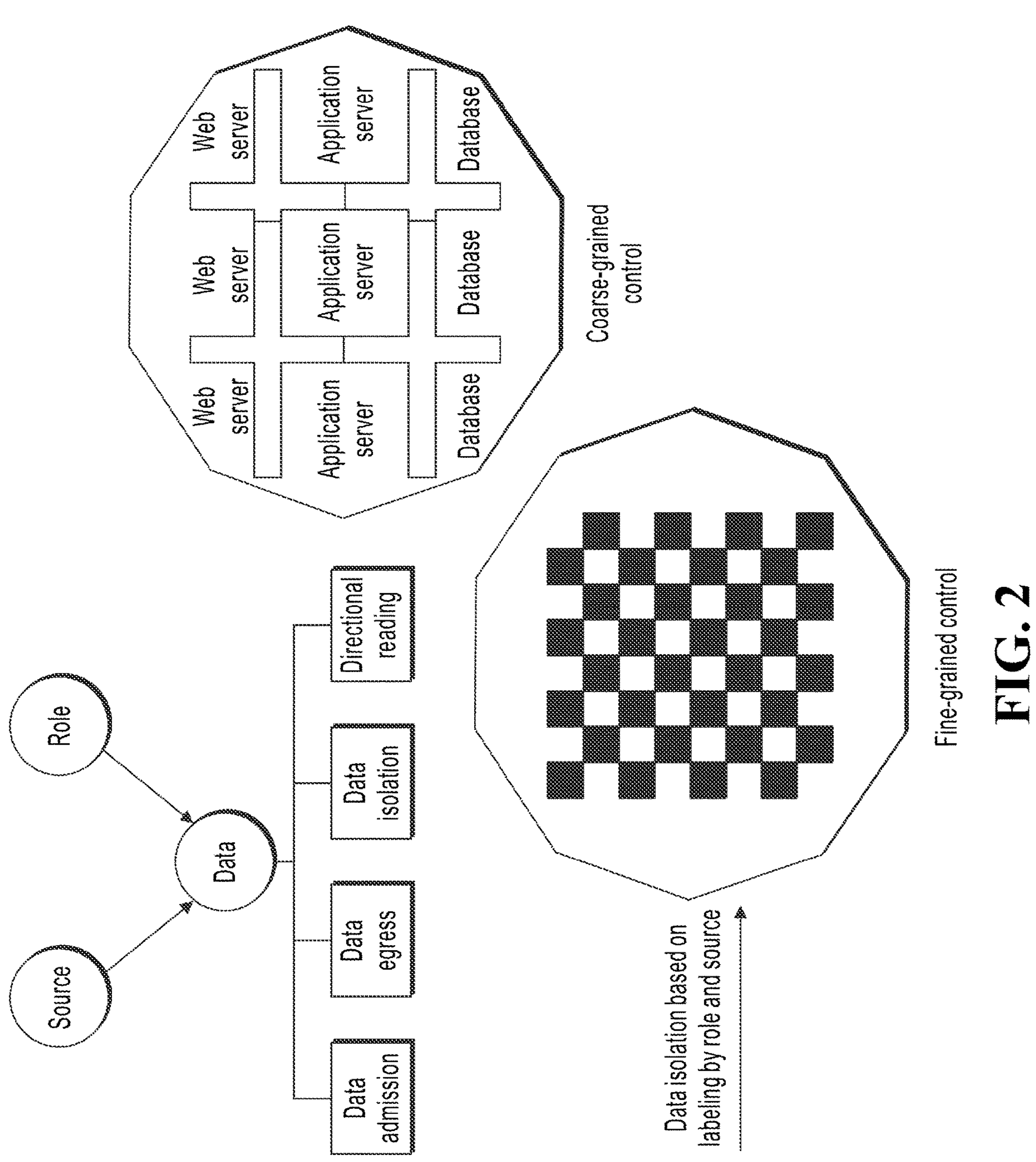
FIG. 2 is a schematic diagram illustrating a process of performing data control on a zero-trust security container, according to some embodiments of this specification.

The specific implementations of this specification will be described in detail below with reference to the accompanying drawings, so that the above-mentioned objectives, features, and advantages of this specification can be more clearly understood.

Many specific details are illustrated in the following description to facilitate adequate understanding of this specification. However, this specification can be implemented in another approach different from the approaches described here. Therefore, this specification is not limited to the specific embodiments disclosed below.

Data experiences three states throughout its lifecycle: at-rest, in-transit, and in-use. In the at-rest state, the data is usually stored in a hard disk, a flash memory, or another storage device. The in-transit state means that the data is being transmitted from one place to another through a public network or a private network. A user can encrypt a file before transmission or use a secure transmission protocol to ensure data security during transmission, such as HTTPS, SSL, TLS, or FTPS. However, in conventional technologies, the data in the in-use state is less well-protected.

Current forms of container technologies are mainly embodied in application containerization (for example, Docker) and system containerization (for example, LXC). Containers in both forms allow IT staff to abstract program code from an underlying architecture, thereby implementing portability across various deployment environments. Security of the containers is achieved by isolating malicious applications to prevent them from destroying other applications. Main application scenarios include untrusted-load isolation, multi-tenant application isolation, and performance and fault isolation, etc.

In fact, a container is a special process that divides resources, files, devices, states, and configurations into separate spaces by using namespaces, control groups, and chroot technologies. With respect to application containerization (that is, an applet container), although applets are sufficiently isolated from platform-side applications in a framework, little control is performed on data inputs/outputs. Consequently, a large quantity of issues are caused, such as unauthorized access, information leakage, privacy issues, data security issues, and ecological issues.

Currently, a designed mode of a container for data is "loose admission and loose egress", meaning that all source inputs are placed into one shared input pool, and security operations such as identity verification are not provided for reading/writing, and random reading/writing can be performed based on a key. Moreover, return data is not verified, either, and any invoking party can receive the same return. Lack of verification on inputs may cause an attacker to use parameters of an input container as attack load, interfering with normal operation of a container mechanism. Lack of verification on outputs may lead to various privacy leakage risks.

Therefore, to ensure container security, it is also necessary to perform effective control on data (especially in-use data). This specification incorporates a zero-trust security container to implement strict data control on security containers.

In this specification, an applet container of an Android system is mainly used as an example for specific description of data control solutions for a security container. However, a person skilled in the art can understand that the technical solutions of this specification are also applicable to an applet container of an IOS system, and are further applicable to data control for system containerization. Details are omitted for simplicity below.

FIG. 1 is a flowchart illustrating a data control method 100 for a zero-trust security container, according to some embodiments of this specification.

In 102, a zero-trust security policy is generated based on a scenario.

Zero-trust security means that by default, no individual, device, or system inside or outside a network should be trusted, and a trust foundation for access control needs to be reconstructed based on authentication and authorization. For example, IP addresses, hosts, geographical locations, residing networks, etc. cannot be used as credentials of trustworthiness. Zero-trust is essentially identity-centric access control, leading a security system architecture from "network centralization" to "identity centralization".

The zero-trust security container of this specification trusts none of input data, regardless of whether the data comes from application platforms, applets, or other bundles. In Android systems, a bundle is mainly used to transfer data. Data stored in the bundle exists in a key-value form (a key value pair). The data can be admitted only after multiple rounds of verification.

Similarly, the zero-trust security container of this specification trusts none of reading parties that request data outputs, regardless of whether the reading parties are application platforms, applets, or other bundles. The data can be egressed only after multiple rounds of verification.

The multiple rounds of verification performed before data is admitted or egressed are based on the zero-trust security policy. Assertions of the zero-trust security policy include the following: It should be always assumed that threats are present; threats are present outside containers, in applets, and even inside the containers at all times; and trust relationships cannot be established only by using labels or parameters. The zero-trust security policy can actually serve as an underlying design of an access control policy. In different application scenarios, the access control policy can be dynamically evaluated and determined based on the assertions of the zero-trust security policy due to changes of as many data sources as possible.

In different scenarios, the zero-trust security policy can be adjusted based on the above-mentioned principles. Therefore, a corresponding zero-trust security policy can be generated based on a scenario.

In 104, a data pool for a zero-trust security container is built.

To perform data control on a zero-trust security container, a data pool for the zero-trust security container is first built. Data control is performed on all of an input end, an output end, and the inside of the data pool based on zero-trust security. All sensitive data and runtime data needed by the container are included into the data pool and verified based on the zero-trust security policy during input, output, and internal operation.

An architecture of the data pool for the zero-trust security container is described in detail below with reference to FIG. 4.

In 106, the zero-trust security policy is adopted for data to be in or out of the data pool, where admission or egress is allowed for the data only after the data is verified based on the zero-trust security policy.

The zero-trust security policy needs to be adopted to perform control on the data to be in or out of the data pool. Assertions of the adopted zero-trust security policy include the following: It should be always assumed that threats are present; threats are present outside containers, in applets, and even inside the containers at all times; and trust relationships cannot be established only by using labels or parameters.

The zero-trust security policy substantially includes trusting none of data reading/writing parties. Based on the above-mentioned assertions, any data to be used by the zero-trust security container is verified based on the zero-trust security policy. For the zero-trust security container, data verification involves a verification initiator and a verification operator. The verification initiator includes another bundle/SDK, an interior of a container, an applet, network traffic, etc. The verification operator includes platform triggering, external network triggering, applet autonomous triggering, user autonomous triggering, etc.

The above-mentioned zero-trust security policy is specifically an access control policy for data to be used. For the zero-trust security container, during data use, the access control policy uses role-based access control (RBAC), in other words, a role determines a permission, and permissions are hierarchized based on roles, and a principle of minimum permissions is followed. The RBAC simply decouples a user from a permission, but associates a user with a role and the role with a permission. Roles are classification management performed for many users with similar permissions. The roles are in upper-lower relationships and can form a tree structure. Permissions of a parent role are the sum of permissions of the parent role itself and permissions of child roles.

In some embodiments of this specification, the access control policy for the zero-trust security container further includes the following: a data source is verified for data to be written to the data pool; and data whose source is verified is admitted, where the admitted data is labeled with a source label. In some embodiments of this specification, the data source can include a network, a bundle, a container itself, a JSAPI, etc. A person skilled in the art can understand that the data source can include other sources that are not exhausted, and details are omitted here for simplicity.

In some other embodiments of this specification, the access control policy for the zero-trust security container further includes the following: a source and a role of a data writing party are verified for data to be written to the data pool; and data whose source and role of a data writing party are verified is admitted, where the admitted data is labeled with a source label and a role label of the data writing party.

In still some other embodiments of this specification, the access control policy for the zero-trust security container further includes the following: a source, a role of a data writing party, and a role of a data reading party that are provided by the data reading party are verified for data to be read from the data pool; and data whose source, role of a data writing party, and role of a data reading party are verified is egressed.

The access control policy for the zero-trust security container is self-adaptive, that is, a context-related access policy is set by using machine learning, and the policy is automatically adjusted and adapted.

During data use, directivity of the data use is clear, that is, the data in the data pool can be read directionally. When the verification initiator and the verification operator are explicitly determined, specified data can be accessed.

A person skilled in the art can understand that, the above-mentioned zero-trust security policy can further be embodied as another access control policy, such as Discretionary Access Control (DAC), Mandatory Access Control (MAC), a Bell-Lapadula security model, or a Biba security model. Further, these access control policies can be combined and configured for different levels of data based on different application scenarios. Details about settings of the access control policy are omitted here for simplicity.

In 108, data in the data pool are hierarchically isolated based on the zero-trust security policy, so that the data in the data pool can be read directionally.

Linux containers use a Namespace to implement "isolation". The Namespace modifies a "view" of a whole computer perceived by an application process, that is, the application process can only "see" certain specified content. For a host, "isolated" processes are not different from other processes.

Because a container that uses a Namespace as an isolation means does not need a separate Guest OS, additional resource occupation by the container is almost negligible. However, such practice also poses a problem of incomplete isolation, as an operating system kernel of the same host is used by multiple containers. Further, many resources and objects in a Linux kernel cannot be Namespace-based, for example, time.

Therefore, Linux Cgroups is used to limit upper limits of resources that can be used by a process group, including a CPU, a memory, a disk, a network bandwidth, etc. In addition, Cgroups can further perform priority setting, auditing, and process suspension and restoration for processes.

The above-mentioned isolation of a container is merely to isolate applets from platform-side applications in the framework, and the data in the data pool is not isolated.

For the data in the data pool, different levels of control can be performed to securely isolate the data. Coarse-grained and fine-grained control can be performed on the data from different dimensions. In data control of a security container, only coarse-grained control is performed on sensitive data. In addition to control on sensitive data, fine-grained control is performed on runtime data.

As shown in FIG. 2, the data in the data pool is hierarchically isolated from other dimensions. To be specific, at a coarse-grained level, access control is performed on a data stream between servers, for example, data from different sources is isolated. At a fine-grained level, data access is restricted based on a role (or an identity, which is collectively referred to as a "role" here), a source, etc. Each piece of data in the data pool is added with a role label and a source label. Data with different role labels and source labels are mutually isolated.

To further improve certainty of data access, a role needs to be continuously and dynamically verified throughout an access lifecycle, especially in a case with changes of contexts, such as an environment context, a space-time context, an operation context, and path dependency. In the zero-trust security container, the zero-trust security policy that trusts none of data reading/writing parties promotes continuous dynamic verification on a role that is to use data, thereby improving data security.

In some embodiments of this specification, only data with an explicit role label and source label can be written to the data pool. A data reading party needs to carry its own role and a target role to accurately read data. Therefore, the data in the data pool can be read directionally.

Therefore, the data control method for a zero-trust security container disclosed in this specification verifies data to be in or out of the data pool, and isolates the data in the data pool, thereby ensuring data security of the zero-trust security container. In other words, strict data control on a security container is implemented by performing finer-grained control on all data to be used by the container.

FIG. 2 is a schematic diagram illustrating a process of performing data control on a zero-trust security container, according to some embodiments of this specification. The data pool for the zero-trust security container in this specification performs admission/egress verification, isolated storage, and directional reading and use for all data.

As shown in FIG. 2, in some embodiments of this specification, before data enters the data pool, a source and a role of a data writing party role are verified. Data whose source and role of a data writing party are verified is admitted. On the contrary, data whose source or role of a data writing party are unclear or cannot be verified is not admitted. All admitted data is added with a source label and a role label of a data writing party.

In some other embodiments of this specification, before data enters the data pool, a source is verified. Data whose source is verified is admitted. On the contrary, data whose source is unclear or cannot be verified is not admitted. All admitted data is added with a source label.

In still some other embodiments of this specification, before data enters the data pool, a role of a data writing party is verified. Data whose role of a data writing party is verified is admitted. On the contrary, data whose role of a data writing party is unclear or cannot be verified is not admitted. All admitted data is added with a role label of a data writing party.

For the data in the data pool, different levels of control can be performed to securely isolate the data. Coarse-grained and fine-grained control can be performed on the data from different dimensions. In data control of a security container, only coarse-grained control is performed on sensitive data. In addition to control on sensitive data, fine-grained control is performed on runtime data.

As shown in FIG. 2, control is performed from dimensions of a data source, a role of a data writing party, and a role of a data reading party. In some embodiments of this specification, coarse-grained control can be performed on data. For example, data is classified or hierarchized based on a data source to form different data domains. The data is added with a source label. For another example, data is classified or hierarchized based on a role of a data reading/writing party to form different data domains. The data is added with a role label. When different data domains are formed based on data sources, data can be isolated based on different web servers, application servers, databases, etc., so that data from different servers can be stored in different domains. In addition, further, a web server can access only data of a corresponding application server, and an application server can access only data of a corresponding database.

In some other embodiments of this specification, fine-grained control can be performed on data. For example, data is classified or hierarchized based on a data source and a role of a data reading/writing party to form different data domains. Specifically, each piece of data in the data pool is added with a role label and a source label. Data with different role labels and source labels are mutually isolated, thereby implementing data isolation by role label and source label.

After the data in the data pool is isolated into different data domains, corresponding protection levels can be set for the data domains. Such practice means that after data is generated, different levels of security protection are provided based on a corresponding security policy throughout a lifecycle of storage, use, and transmission of the data.

To obtain data in the data pool, in some embodiments of this specification, similarly, the data can be read by a reading party only when dual labels (that is, a role label and a source label) are specified. The reading party needs to carry a role of the reading party (its own identity) and a role of a data writing party (a target identity) to perform reading. For example, a function developer needs to know an upstream label of a parameter used by the function developer to accurately obtain the parameter. Data can be egressed only when a role and a source are verified. As such, data can be read directionally, that is, a reading party that can specify dual labels can read the data.

In some other embodiments of this specification, a reading party can read only when specifying a source label. Data can be egressed only when a source is verified. As such, data can be read directionally, that is, a reading party that can specify a source label can read the data.

In still some other embodiments of this specification, a reading party can read only when specifying a role of a data writing party. Only data whose role of a data writing party is verified can be egressed. As such, data can be read directionally, that is, a reading party that can specify a role label of the data writing party can read the data.

Figure 3:
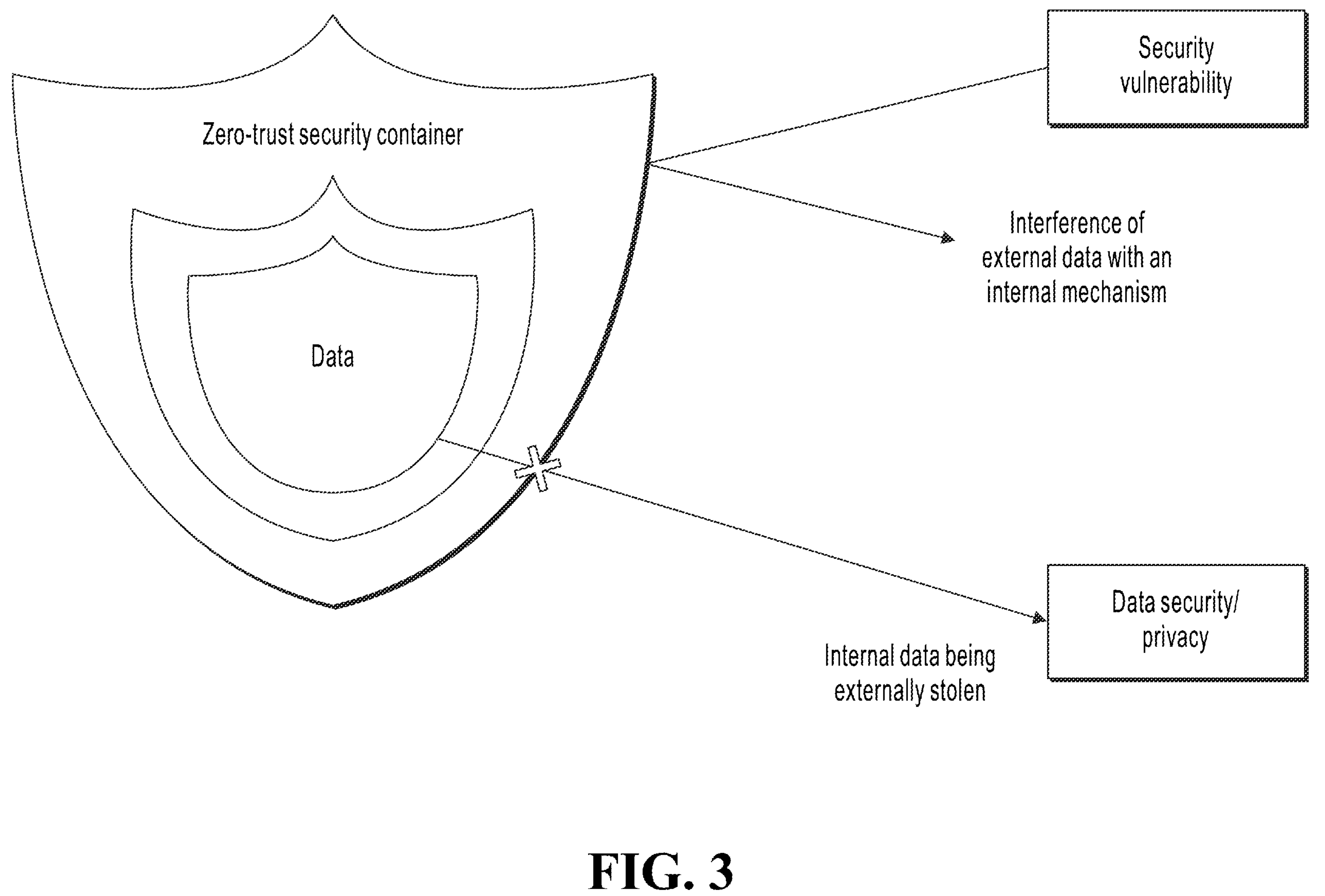
FIG. 3 is a schematic diagram illustrating risk isolation that can be achieved for data control on a zero-trust security container, according to some embodiments of this specification.

FIG. 3 is a schematic diagram illustrating risk isolation that can be achieved for data control on a zero-trust security container, according to some embodiments of this specification.

According to some embodiments of this specification, due to the above-mentioned data control on a zero-trust security container, verification upon data admission can prevent data from being exploited as attack load, verification upon data egress can prevent internal data from being stolen externally and prevent various privacy leakage risks to ensure data security, and directional reading of data can prevent external data from interfering with operation of an internal mechanism, thereby reducing security vulnerabilities.

In this specification, as fine-grained data control is performed on both sensitive data and runtime data, the data can be isolated from risks and security can be ensured.

Figure 4:
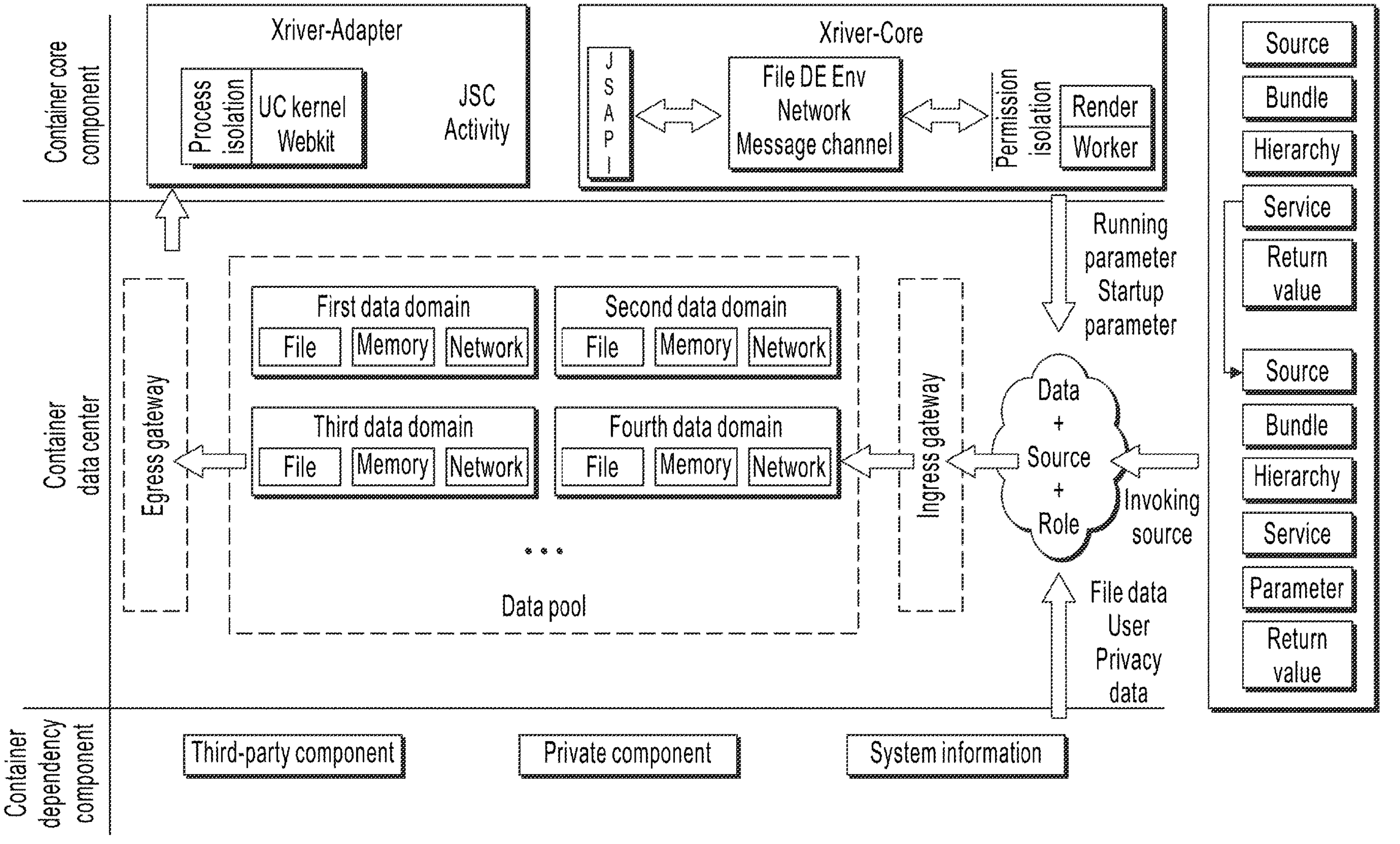
FIG. 4 is a schematic diagram illustrating a data pool architecture for a zero-trust security container, according to some embodiments of this specification.

FIG. 4 is a schematic diagram illustrating a data pool architecture for a zero-trust security container, according to some embodiments of this specification.

As shown in FIG. 4, according to some embodiments of this specification, in a container core component of an Android system, "process isolation" is implemented by using a Namespace, and "permission isolation" is implemented by using Cgroups. A running parameter and a startup parameter of the container core component are used as runtime data to enter a container data center.

A data pool of the container data center is shared by zero-trust security containers. An external input parameter that needs to be used in any container, such as a whitelist, a start parameter, a JSAPI parameter, or a switch configuration, can only be obtained from the data pool.

The data pool of the container data center is configured with an ingress gateway and an egress gateway to separately verify data to be in or out of the data pool. Data in the data pool comes from the container core component, an invoking source, a container dependency component, etc. The running parameter and the startup parameter of the container core component, data from the invoking source, file data and user privacy data of the container dependency component, etc. enter the data pool through the ingress gateway.

Data admission is a process of verifying data before the data is written. Only data whose identity is verified can be written to the pool. In some embodiments of this specification, as shown in FIG. 4, identity verification on data can be verification on both a source and a role. Each piece of data entering the data pool carries two labels, that is, a role label and a source label. In some other embodiments of this specification, identity verification on data can be verification on either a source or a role.

Data egress is a process of verifying a data reading party before data is output. In some embodiments of this specification, the reading party needs to carry its own identity and a target identity to accurately read data, and a reading behavior is recorded and controlled.

In some embodiments of this specification, as shown in FIG. 4, in the data pool of the container data center, parameters with different role labels and source labels are mutually isolated, and are stored in different data domains, for example, a first data domain, a second data domain, a third data domain, and a fourth data domain. In these data domains, file data, memory data, network data, etc. can be stored separately.

In the embodiments, data in these data domains can be read/written only when dual labels are specified, that is, a function developer needs to know an upstream label of a parameter used by the function developer to accurately obtain the parameter. The two types of labels are generated by a container's own code, and is not generated by a read/write initiator. A container independently determines a source label and a role source of admitted data based on a data source (i.e., a network/another bundle/the container itself/a JSAPI).

For generated role labels and source labels, a corresponding asset library and a control capability based on the role labels and source labels need to be established, details are omitted here for simplicity.

A person skilled in the art can understand that the data pool architecture for a zero-trust security container shown in FIG. 4 is merely an example rather than a limitation, and data isolation can be performed at different levels based on different dimensions and scenarios, as shown in FIG. 2. Data labels can also be applied differentially based on different scenarios, and different admission, egress, and isolation can be performed accordingly.

Figure 5:
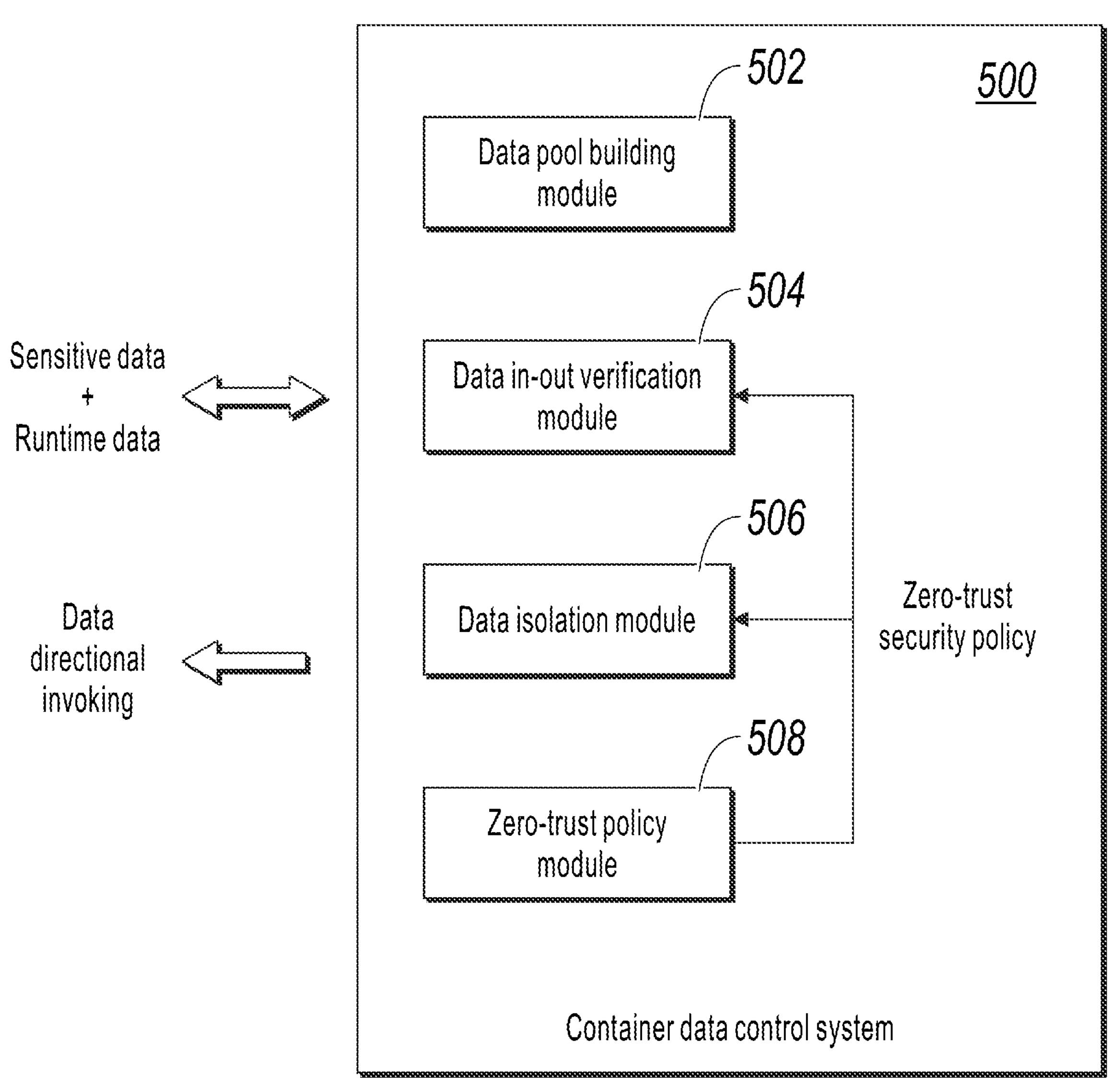
FIG. 5 is a block diagram illustrating a data control system for a zero-trust security container, according to some embodiments of this specification.

FIG. 5 is a block diagram illustrating a container data control system 500 for a zero-trust security container, according to some embodiments of this specification.

The container data control system 500 includes a zero-trust policy module 502, a data pool building module 504, a zero-trust verification module 506, and a data isolation module 508.

The zero-trust policy module 502 generates a zero-trust security policy based on a scenario.

The zero-trust security container of this specification trusts none of input data, regardless of whether the data comes from application platforms, applets, or other bundles. In Android systems, a bundle is mainly used to transfer data. Data stored in the bundle exists in a key-value form (a key value pair). The data can be admitted only after multiple rounds of verification. Similarly, the zero-trust security container of this specification trusts none of reading parties that request data outputs, regardless of whether the reading parties are application platforms, applets, or other bundles. The data can be egressed only after multiple rounds of verification.

The multiple rounds of verification performed before data is admitted or egressed are based on the zero-trust security policy. Assertions of the zero-trust security policy include the following: It should be always assumed that threats are present; threats are present outside containers, in applets, and even inside the containers at all times; and trust relationships cannot be established only by using labels or parameters. The zero-trust security policy can actually serve as an underlying design of an access control policy.

In different scenarios, the zero-trust security policy can be adjusted based on the above-mentioned principles. Therefore, the zero-trust policy module 502 can generate a corresponding zero-trust security policy based on a scenario. The zero-trust security policy generated by the zero-trust policy module 502 based on the scenario is transferred to the zero-trust verification module 506 and the data isolation module 508.

The data pool building module 504 builds a data pool for a zero-trust security container.

Based on the architecture shown in FIG. 4, to perform data control on the zero-trust security container, the data pool building module 504 first builds the data pool for the zero-trust security container. Data control is performed on all of an input end, an output end, and the inside of the data pool based on zero-trust security. All sensitive data and runtime data needed by the container are included into the data pool and verified based on the zero-trust security policy during input, output, and internal operation.

The zero-trust verification module 506 adopts the zero-trust security policy for data to be in or out of the data pool, where admission or egress is allowed for the data to be in or out of the data pool only after the data is verified based on the zero-trust security policy.

The sensitive data and runtime data are to enter the shared data pool for the container that is built by the data pool building module 504. The zero-trust verification module 506 needs to adopt the zero-trust security policy to perform control on the data to be in or out of the data pool. Assertions of the adopted zero-trust security policy include the following: It should be always assumed that threats are present; threats are present outside containers, in applets, and even inside the containers at all times; and trust relationships cannot be established only by using labels or parameters. The zero-trust security policy substantially includes trusting none of data reading/writing parties.

The above-mentioned zero-trust security policy is specifically an access control policy for data to be used. In some embodiments of this specification, the access control policy of the zero-trust verification module 506 for the zero-trust security container further includes the following: a data source is verified for data to be written to the data pool; and data whose source is verified is admitted, where the admitted data is labeled with a source label.

In some other embodiments of this specification, the access control policy of the zero-trust verification module 506 for the zero-trust security container further includes the following: a source and a role of a data writing party are verified for data to be written to the data pool; and data whose source and role of a data writing party are verified is admitted, where the admitted data is labeled with a source label and a role label of the data writing party.

In still some other embodiments of this specification, the access control policy of the zero-trust verification module 506 for the zero-trust security container further includes the following: a source, a role of a data writing party, and a role of a data reading party that are provided by the data reading party are verified for data to be read from the data pool; and data whose source, role of a data writing party, and role of a data reading party are verified is egressed.

The data isolation module 508 hierarchically isolates data in the data pool based on the zero-trust security policy, so that the data in the data pool can be read directionally.

For the data in the data pool, the data isolation module 508 can perform different levels of control to securely isolate the data. Coarse-grained and fine-grained control can be performed on the data from different dimensions. In data control of a security container, only coarse-grained control is performed on sensitive data. In addition to control on sensitive data, fine-grained control is performed on runtime data.

As shown in FIG. 2, the data isolation module 508 hierarchically isolates the data in the data pool from other dimensions. To be specific, at a coarse-grained level, access control is performed on a data stream between servers, for example, data from different sources is isolated. At a fine-grained level, data access is restricted based on a role (or an identity, which is collectively referred to as a "role" here), a source, etc. Each piece of data in the data pool is added with a role label and a source label. Data with different role labels and source labels are mutually isolated.

Therefore, after the data isolation module 508 hierarchically isolates the data in the data pool based on the zero-trust security policy, the data in the data pool can be invoked directionally. In other words, during data use, directivity of the data use is clear, that is, the data in the data pool can be read directionally.

Therefore, the data control system for a zero-trust security container disclosed in this specification verifies data to be in or out of the data pool, and isolates the data in the data pool, thereby ensuring data security of the zero-trust security container. In other words, strict data control on a security container is implemented by performing finer-grained control on all data to be used by the container.

Steps and modules of the above-mentioned data control method and system for a zero-trust security container can be implemented by hardware, software, or a combination thereof. For implementation in hardware, various illustrative steps, modules, and circuits described with reference to this specification can be implemented or executed by a general-purpose processor, a digital signal processor (DSP), an application-specific integrated circuit (ASIC), a field programmable gate array (FPGA), or another programmable logic component, hardware component, or any combination thereof. The general-purpose processor can be a processor, a microprocessor, a controller, a microcontroller, or a state machine, etc. For implementation in software, various illustrative steps and modules described with reference to this specification can be stored on a computer-readable medium or transmitted as one or more instructions or code. A software module for implementing various operations of this specification can reside in a storage medium, such as a RAM, a flash memory, a ROM, an EPROM, an EEPROM, a register, a hard disk, a removable disk, a CD-ROM, or a cloud storage, etc. The storage medium can be coupled to a processor, so that the processor can read information from/write information to the storage medium, and execute a corresponding program module to implement the steps of this specification. Furthermore, software-based embodiments can be uploaded, downloaded, or remotely accessed by suitable communication means. Such suitable communication means include, for example, the Internet, the World Wide Web, intranets, software applications, cables (including optical fiber cables), magnetic communication, electromagnetic communication (including RF, microwaves, and infrared communication), electronic communication, or other such communication means.

It should further be noted that these embodiments may be described as processes depicted as flowcharts, flow diagrams, structural diagrams, or block diagrams. Although a flowchart may describe operations as sequential processes, many of these operations can be performed in parallel or concurrently. In addition, an order of these operations can be re-arranged.

The disclosed methods, apparatuses, and systems shall not be limited in any way. In contrast, this specification covers all novel and non-obvious features and aspects of various disclosed embodiments (individual embodiments and various combinations and sub-combinations of the embodiments). The disclosed methods, apparatuses, and systems are not limited to any particular aspect or feature or combination thereof, and any embodiment disclosed does not require presence of any particular advantage or advantages or solutions to specific or all technical problems.

The embodiments of this specification are described with reference to the accompanying drawings above. However, this specification is not limited to the above-mentioned specific implementations, which are merely examples but not limitations. A person of ordinary skill in the art under an enlightenment of this specification can make many modifications without departing from the objective of this specification and the protection scope of the claims. All of these modifications shall fall within the protection scope of this specification.

What is claimed is:

1. A computer-implemented method for zero-trust security container data control, comprising:

generating a zero-trust security policy based on a scenario; building a data pool for a zero-trust security container;

adopting the zero-trust security policy for data to be admitted to or egressed from the data pool and while within the data pool, wherein admission or egress is allowed for the data to be in or out of the data pool only after the data is verified based on the zero-trust security policy; and hierarchically isolating data in the data pool based on the zero-trust security policy and so that the data in the data pool can be read directionally, wherein isolating the data in the data pool includes limiting upper limits of resources that can be used by a process group, and wherein course-grained and fine-grained control is performed on the data in the data pool from different dimensions comprising one or more of a data source, a role of a data writing party, and a role of a data reading party, wherein at a coarse-grained level, access control is performed on a data stream between servers, wherein at a fine-grained level, data access is restricted based on one or more of a role, an identity, or a source, and wherein each piece of data in the data pool has a role label and a source label, and data with different role labels and source labels are mutually isolated.

2. The computer-implemented method of claim 1, wherein the zero-trust security policy comprises trusting none of data reading/writing parties.

3. The computer-implemented method of claim 2, wherein the zero-trust security policy comprises:

verifying a source for data to be written to the data pool; and admitting, as admitted data, data whose source is verified, wherein the admitted data is labeled with a source label.

4. The computer-implemented method of claim 2, wherein the zero-trust security policy comprises:

verifying a source and a role of a data writing party for data to be written to the data pool; and admitting, as admitted data, data whose source and role of a data writing party are verified, wherein the admitted data is labeled with a source label and a role label of the data writing party.

5. The computer-implemented method of claim 3, wherein the zero-trust security policy comprises:

verifying, for data to be read from the data pool, a source, a role of a data writing party, and a role of a data reading party that are provided by the data reading party; and egressing data whose source, role of a data writing party, and role of a data reading party are verified.

6. The computer-implemented method of claim 1, wherein the hierarchically isolating data in the data pool based on the zero-trust security policy comprises isolating the data pool into multiple data domains.

7. The computer-implemented method of claim 6, wherein isolating the data pool into multiple data domains comprises isolating the data into the multiple data domains by sensitive data and runtime data.

8. The computer-implemented method of claim 6, wherein isolating the data pool into multiple data domains comprises isolating the data into the multiple data domains by source and/or role.

9. The computer-implemented method of claim 6, wherein corresponding protection levels are set for the multiple data domains.

10. A non-transitory, computer-readable medium storing one or more instructions executable by a computer system to perform one or more operations for zero-trust security container data control, comprising:

generating a zero-trust security policy based on a scenario;

building a data pool for a zero-trust security container;

adopting the zero-trust security policy for data to be admitted to or egressed from the data pool and while within the data pool, wherein admission or egress is allowed for the data to be in or out of the data pool only after the data is verified based on the zero-trust security policy; and hierarchically isolating data in the data pool based on the zero-trust security policy and so that the data in the data pool can be read directionally, wherein isolating the data in the data pool includes limiting upper limits of resources that can be used by a process group, and wherein course-grained and fine-grained control is performed on the data in the data pool from different dimensions comprising one or more of a data source, a role of a data writing party, and a role of a data reading party, wherein at a coarse-grained level, access control is performed on a data stream between servers, wherein at a fine-grained level, data access is restricted based on one or more of a role, an identity, or a source, and wherein each piece of data in the data pool has a role label and a source label, and data with different role labels and source labels are mutually isolated.

11. The non-transitory, computer-readable medium of claim 10, wherein the zero-trust security policy comprises trusting none of data reading/writing parties.

12. The non-transitory, computer-readable medium of claim 11, wherein the zero-trust security policy comprises:

verifying a source for data to be written to the data pool; and admitting, as admitted data, data whose source is verified, wherein the admitted data is labeled with a source label.

13. The non-transitory, computer-readable medium of claim 11, wherein the zero-trust security policy comprises:

verifying a source and a role of a data writing party for data to be written to the data pool; and admitting, as admitted data, data whose source and role of a data writing party are verified, wherein the admitted data is labeled with a source label and a role label of the data writing party.

14. The non-transitory, computer-readable medium of claim 12, wherein the zero-trust security policy comprises:

verifying, for data to be read from the data pool, a source, a role of a data writing party, and a role of a data reading party that are provided by the data reading party; and egressing data whose source, role of a data writing party, and role of a data reading party are verified.

15. The non-transitory, computer-readable medium of claim 10, wherein the hierarchically isolating data in the data pool based on the zero-trust security policy comprises isolating the data pool into multiple data domains.

16. The non-transitory, computer-readable medium of claim 15, wherein isolating the data pool into multiple data domains comprises isolating the data into the multiple data domains by sensitive data and runtime data.

17. The non-transitory, computer-readable medium of claim 15, wherein isolating the data pool into multiple data domains comprises isolating the data into the multiple data domains by source and/or role.

18. The non-transitory, computer-readable medium of claim 15, wherein corresponding protection levels are set for the multiple data domains.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for zero-trust security container data control, comprising:

generating a zero-trust security policy based on a scenario;

building a data pool for a zero-trust security container;

adopting the zero-trust security policy for data to be admitted to or egressed from the data pool and while within the data pool, wherein admission or egress is allowed for the data to be in or out of the data pool only after the data is verified based on the zero-trust security policy; and hierarchically isolating data in the data pool based on the zero-trust security policy and so that the data in the data pool can be read directionally, wherein isolating the data in the data pool includes limiting upper limits of resources that can be used by a process group, and wherein course-grained and fine-grained control is performed on the data in the data pool from different dimensions comprising one or more of a data source, a role of a data writing party, and a role of a data reading party, wherein at a coarse-grained level, access control is performed on a data stream between servers, wherein at a fine-grained level, data access is restricted based on one or more of a role, an identity, or a source, and wherein each piece of data in the data pool has a role label and a source label, and data with different role labels and source labels are mutually isolated.

20. The computer-implemented system of claim 19, wherein the zero-trust security policy comprises trusting none of data reading/writing parties.

* * * * *